United States Patent [19]

Boser et al.

[11] 4,446,502

[45] May 1, 1984

[54] METALLURGICAL CONTACTS IN HERMETICALLY SEALED GLASS ENCAPSULATED CERAMIC CAPACITORS

[75] Inventors: Otmar H. Boser, Scarsdale; Richard C. Sweet, North Tarrytown, both of N.Y.

[73] Assignee: U.S. Philips Corporation, New York, N.Y.

[21] Appl. No.: 388,041

[22] Filed: Jun. 14, 1982

[51] Int. Cl.³ .................... H01G 1/14; H01G 4/10
[52] U.S. Cl. .................................. 361/308; 361/321
[58] Field of Search ............. 29/25.42; 361/301, 306, 361/308, 309, 275, 272, 321

[56] References Cited

U.S. PATENT DOCUMENTS 2,585,752  2/1952  Dorst .................................. 29/25.42
3,458,783  7/1969  Rosenberg ....................... 361/321 X
3,539,885  11/1970 England ............................. 361/308
4,109,292  8/1978  Shibayama et al. ............ 361/306 X
4,117,589  10/1978 Francis et al. ................... 361/308 X

OTHER PUBLICATIONS

IEEE 27th Electronic Components Conference, 1977, pp. 387 to 390, Hermetic Glass Encapsulated Capacitors.

Primary Examiner—Donald A. Griffin
Attorney, Agent, or Firm—Thomas A. Briody; Jack E. Haken; James J. Cannon, Jr.

[57] ABSTRACT

An improved hermetically sealed glass encapsulated monolithic ceramic capacitor in which a metallurgical bond between the capacitor termination and the end cap of its lead is effected by means of brazing.

6 Claims, 3 Drawing Figures

METALLURGICAL CONTACTS IN HERMETICALLY SEALED GLASS ENCAPSULATED CERAMIC CAPACITORS

BACKGROUND OF THE INVENTION

1. Field of the Invention

This invention pertains to miniature hermetically sealed glass encapsulated ceramic capacitors and is more particularly directed to the formation of a metallurgical bond between the capacitor termination and the end cap.

2. Description of the Prior Art

The construction of a hermetically sealed, glass encapsulated ceramic capacitor has been discussed in an article entitled "Hermetic Glass Encapsulated Capacitors," by W. Love III and M. Rosenberg, published in the Proceedings of the IEEE 27th Electronic Components Conference, 1977, pages 387 to 390. U.S. Pat. No. 3,458,783 issued to the same M. Rosenberg discloses the hermetically sealed capacitor whose manufacture is discussed in the article just cited. According to this patent, a monolithic ceramic capacitor chip has opposed edge terminations coated with silver. These edges are located between and abutted by metallic surfaces of enlarged ends of leads for the capacitor. A glass sleeve surrounds the chip and the enlarged ends, and a glass-to-metal seal is effected between the sleeve and the enlarged ends, directly or through glass beads on such ends. By virtue of the heat seal, abutting copper and silver surfaces are caused to be bonded together. The contacting conductive surfaces in this construction are physically and conductively secured together. In effect, these abutting metal surfaces are fused together by a parent weld, that is, a weld formed of the two metals and without the use of flux or solder.

Many companies currently manufacture hermetically sealed, glass encapsulated ceramic capacitors using variations of the disclosures referenced above. These commercially available units for the most part contain silver terminated chip capacitors which are hermetically sealed in a glass sleeve between Dumet end caps at about 750° C. These capacitors have an extremely high reliability, especially for use in applications subject to shock, vibration and temperature extremes. The hermetically sealed, glass-encapsulated package was specifically designed for these conditions.

The current failure rate, however, is somewhat higher than desirable and with certain sizes can run as high as 33 parts per million. Current quality control standards require a reliability exceeding this, namely a failure rate of less than 10 parts per million. The cause of the failures has been traced to a failure to achieve the required bond or stable contact between the silver termination and the Dumet end cap during the manufacturing process. If the bond is achieved, the failure rate will approach 0. Recent analyses of device failures indicate that after some temperature cycling, the contact between the silver terminations and Dumet end cap becomes intermittent and that this propensity is present ab initio in the failed units. Upon further study it is apparent from the pressures, temperatures and materials used, that no bond or weld is formed, contrary to the prior art statements. It would appear that the contact between the Dumet end cap and the silver termination of the chip capacitor is in effect, a simple pressure contact that is liable to become intermittent after some temperature cycling.

The present invention is designed to improve the contact between the leads of the glass package and the terminations on the capacitor within the package. To overcome the problems which have occurred, a metallurgical bond between the capacitor termination and the end cap would be a desirable solution. The present invention is directed to three methods for achieving such a metallurgical bond.

Another prior art patent which is relevant to the present invention is U.S. Pat. No. 4,117,589, owned by the assignee of this application. This patent discloses a method for establishing a metallurgical bond between the end termination of a resistor and the enlarged lead of its hermetically sealed glass package. In this prior patent, the emphasis is on the production of a package for a high reliability resistor. While the claims are not limited to resistors, the methods, materials and temperatures disclosed all indicate that the technique of this prior patent is not applicable for use with the hermetically sealed glass encapsulated capacitor.

SUMMARY OF THE INVENTION

The present invention pertains to improved contacts in hermetically sealed glass encapsulated ceramic capacitors, and in particular, to the formation of a metallurgical bond between the terminations of the capacitor and the end caps of its leads. Capacitors made in accordance with the present invention are made substantially as disclosed in the above-referenced prior art except for the formation of a metallurgical bond between the termination of the capacitor and the Dumet end cap of the lead. The basis of the device is a standard rectangular multilayer ceramic capacitor chip. In the present state of the art, silver or silver frit is usually used for terminating the chip. Welded stud leads having enlarged end caps are attached at the ends of the chip. The end cap which contacts the silver termination consists of a copper clad, nickel iron core covered with a borate/oxide coating (Dumetstud). According to the prior art, when the stud is sheared, there is a wipe-over of copper to the end of the stud. This copper contacts the silver termination and allegedly some sort of bond is formed. A wire lead is welded to the opposite end of the stud. The glass tube used for the sealing of the chip capacitor is a soft glass. The present invention is directed to an improvement in which a metallurgical bond between the termination of the chip capacitor and the Dumet end cap is achieved.

In the first and preferred embodiment, the silver end terminations of a standard monolithic chip capacitor are plated with nickel, by either electroless or electrolytic plating. The nickel plated terminations are then coated with a brazing alloy such as a mixture of indium, copper and silver (In—Cu—Ag). At this point the standard process is resumed. The hermetically sealed glass encapsulated monolithic chip capacitor is then manufactured in accordance with the above-cited article. When in the course of the process, the package is heated to 710° C., brazing occurs. A brazed metallurgical bond is then formed between the capacitor termination and the Dumet end cap. This preferred embodiment requires no change in jigs, furnaces, temperatures of sealing, atmosphere, or glass materials.

In the second embodiment, an unterminated monolithic chip capacitor receives a sputtered termination of titanium followed by a sputtered coating of nickel. This titanium-nickel termination is then coated with a brazing alloy of indium, copper and silver, and the normal sealing process is then resumed. Alternatively, the braze alloy may be sputtered in this embodiment.

In the third embodiment, an unterminated monolithic chip capacitor is sputtered with a titanium termination and a nickel coating over the titanium. A silver copper eutetic braze is then sputtered over the titanium nickel termination. The glass sleeve used in the current process must be replaced with a higher melting point glass because the sealing temperature is raised to 800° C. With these changes, the prior art process may be followed, with brazing occurring at about 800° C.

In all three variations, the metallurgical bond formed between the capacitor end termination and the Dumet end cap is a stronger bond than that achieved in the prior art.

DESCRIPTION OF THE PREFERRED EMBODIMENTS

Figure 3:
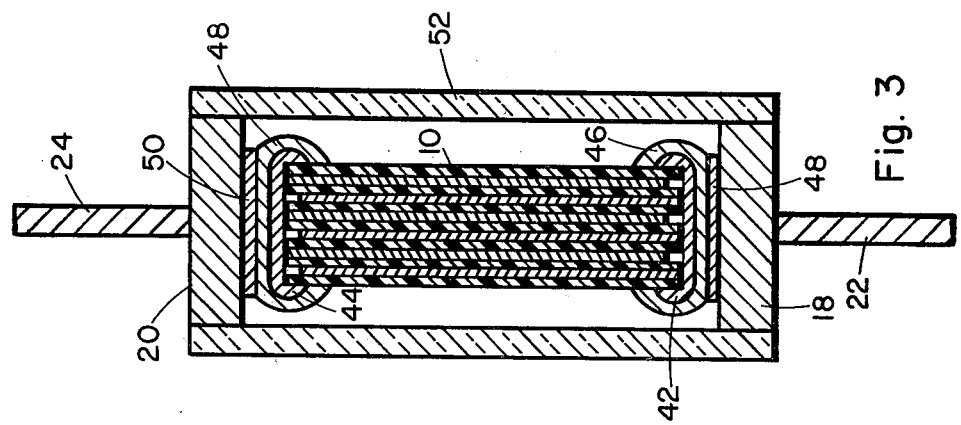
FIG. 3 is a longitudinal sectional view of a second alternate embodiment of the present invention.
Figure 2:
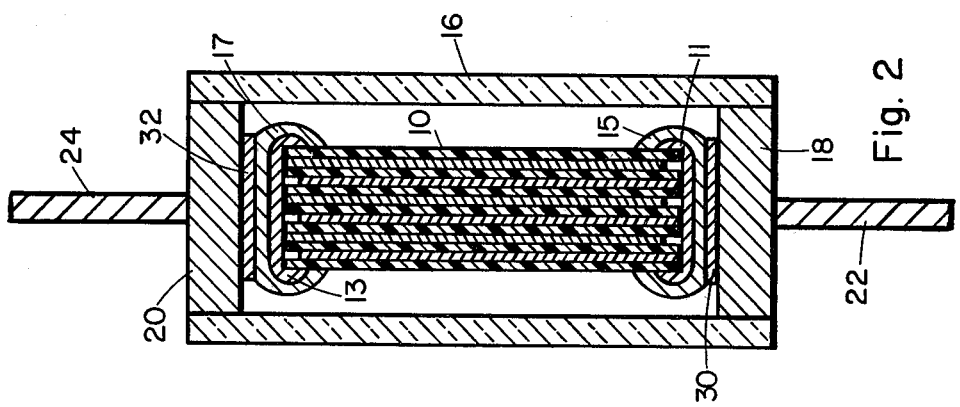
FIG. 2 is a longitudinal sectional view of a first alternate embodiment of the present invention.
Figure 1:
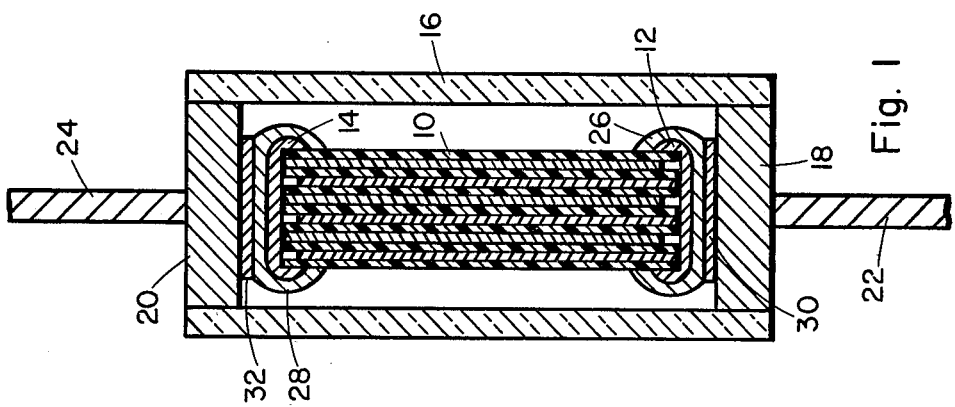
FIG. 1 is a longitudinal sectional view of the preferred embodiment of the present invention.

Referring to FIGS. 1, 2 and 3, there is shown a ceramic capacitor chip 10 which has metal coatings 12–14 covering its opposite ends or edges. As known in the prior art, respective metallic electrodes embedded in the chip body 10 extend to the opposite ends of the body, where they are conductively contacted by the coatings at those ends. In FIG. 1 the coatings 12, 14 are of silver.

As also shown in the figures, which illustrate hermetically sealed, glass encapsulated ceramic chip capacitors, the chips 10 are inserted in glass sleeves 16. Extending into the ends of the sleeve 16 are enlarged heads or end caps 18, 20 of respective leads 22, 24 with the inner faces of such end caps 18, 20 in close proximity to the surfaces of end termination coatings 12, 14. The leads are formed so that end caps 18, 20 are of one material e.g. a nickel iron alloy, known in the art as Dumet, to which copper coated steel wires are brazed or welded or soldered. However, if desired, the end caps may be made of a single metal alloy. The end caps 18, 20 preferably have their inner faces clad with a thin film of a metal with a lower melting point such as copper or aluminum. In the present state of the art these heads are normally a copper clad iron/nickel slug. In the present state of the art the wire leads are usually a copper-plated steel wire.

The description thus far is that of a conventional hermetically sealed glass encapsulated capacitor. With the parts assembled as described, a compressive force is applied to the outer ends of the heads 18, 20 while the assembly is subjected to sufficiently high temperatures (710° C.) in an inert atmosphere, usually nitrogen, to both form a seal between the conforming surfaces of the heads 18, 20 and the glass sleeve 16 and to join the abutting silver end terminations and copper surfaces of the end caps together thus, the assembly upon being cooled forms a hermetically sealed glass encapsulated monolithic capacitor in which the contacting surfaces are physically and conductively secured together and cannot be separated by severe vibrations.

In the prior art literature it is alleged that the contact between the silver coatings 12, 14 and end caps 18, 20 is a parent weld, i.e. a weld formed of the two metals without the use of flux or solder for the contacting surfaces. Elsewhere in the literature, one reads that under pressure and heat, the copper on the surface of the lead studs 18, 20 diffuses into the silver terminations 12, 14 of the chip and forms a brazed joint. Detailed studies of commercially available units built in accordance with the prior art procedures reveals that in effect there is no true weld between the terminations 12, 14 and the studs 18, 20. Further detailed studies indicate that there is virtually no migration of the copper into the silver terminations. The conclusion of these studies is that, given the temperatures and pressures involved, a true weld or braze is not possible. However, a pressure contact is made in most cases. The failures that are encountered, even though the failure rate is very good for a high reliability product, are due primarily to the lack of a stable contact between the lead studs or end caps 18, 20 and the silver terminations 12, 14. Recognizing that the prior art is using, in effect, only a pressure contact and to improve the admittedly low failure rate, the present invention is directed to a brazing of the end caps 18, 20 to the terminations 12, 14 to insure electrical contact and to minimize the failure rate.

In the first embodiment illustrated in FIG. 1, the usual monolithic chip capacitor 10 having silver fritted terminations 12, 14 is utilized. The silver terminations 12, 14 are nickel plated, by either an electroless or an electrolytic process, to yield a thin coating of nickel 26, 28 completely covering the silver terminations 12, 14. Nickel plating 26, 28 is then coated with a braze alloy of indium, copper and silver on each termination. The braze alloy coatings 30, 32 are positioned such that they abut the Dumet end caps 18, 20. At this point the sealing of the unit is achieved by using the prior art process described in the above-cited literature. When the temperature reaches 710° C., brazing occurs and a metallurgical bond is achieved between the Dumet end caps 18, 20 and the nickel plated terminations 12, 14 of the chip capacitor. Thus a stable metallurgical bond is achieved. The advantage of this embodiment is that it requires no change in the manufacturing process, in the jigs, in the furnace, in the glass and in the temperatures and atmospheric pressure that are used. The only changes required are the nickel plating of the silver terminations and coating them with a braze alloy.

FIG. 2 illustrates a second embodiment of the invention in which the silver terminations are not used on the monolithic chip capacitor. In the embodiment of FIG. 2 a standard monolithic chip capacitor is terminated by sputtering a titanium coating 11, 13 on the opposed ends of the chip capacitor. The titanium coatings 11, 13 are then sputtered again with a coating of nickel 15, 17. The procedure for manufacturing this embodiment then is the same as that of the preferred embodiment. The nickel coatings 15, 17 are coated with a braze alloy of indium, copper and silver and the normal process of manufacture is continued. This embodiment has some of the same advantages of the first embodiment, with the exception of the sputtering steps. Alternatively, the brazing alloy of indium, copper and silver may also be sputtered.

The third embodiment of the present invention is illustrated in FIG. 3. In this embodiment, the capacitor terminations 42, 44 are sputtered coatings of titanium which are then covered by sputtered coatings 46, 48 of nickel. In this embodiment, a silver copper eutectic braze is sputtered on the nickel to form coatings 48, 50. For this embodiment, the glass sleeve 52 is changed to a higher melting point glass. Furthermore, the sealing temperature is raised to 800° C. All other procedures in the process of sealing the capacitor remain the same.

The following tables present the results of tests made with conventional hermetically sealed, glass-encapsulated monolithic chip capacitors made in accordance with the prior art and with various embodiments disclosed herein. Table 1 presents the results of conventional hermetically sealed, glass-encapsulated capacitors manufactured by Centralab Inc., and sold under the trademark MONO-GLASS. Notable in these test results is the low dissipation factor and the fact that two of the twelve capacitors tested failed after 300 temperature cycles. Table 2 presents results of tests made on capacitors manufactured according to the second embodiment disclosed herein, the monolithic chip capacitors being terminated by a sputtering of titanium followed by a sputtering of nickel. These test results show a higher dissipation factor after sputtering that further increases upon the sealing and brazing. However, the dissipation factor is within acceptable limits and none of the 48 capacitors failed after 300 temperature cycles.

Tables 3(a) and 3(b) give the results of testing of 48 electroless and 48 electrolytic nickel plated capacitors manufactured according to the preferred embodiment disclosed herein. The dissipation factor of all these capacitors is relatively high in comparison with the conventional commercially available capacitors. However, the dissipation factor is acceptable within the applicable MIL STD requirements. None of the plated capacitors failed upon temperature cycling.

TABLE (1)

CONVENTIONAL, CENTRALAB, EL PASO SEALED, MONO-GLASS CAPACITORS

| As received | | After 100 Cycles | | | | After 300 Cycles | | | |
|---|---|---|---|---|---|---|---|---|---|
| at 1 V | | at 1 V | | at 50 mV | | at 1 V | | at 50 mV | |
| nF | D.F. % | nF | D.F. % | nF | D.F. % | nF | D.F. % | nF | D.F. % |
| 122.3 | 0.7 | 134.8 | 1.1 | 127.6 | 0.6 | 134.5 | 0.9 | 126.9 | 0.6 |

Table (I) Conventional MONO-GLASS Capacitors temperature cycled between 210° C. and 30° C. (T = 180° C.) with 20 min. to heat up and 20 min. to cool down. The values are averages of 12 samples. One capacitor failed after 100 cycles and a second capacitor failed after 300 cycles due to a high dissipation factor. The measurements were performed on a LCR meter HP 4262A at 1 kHz and the stated applied voltage.

TABLE 2

IN-HOUSE SPUTTERED CAPACITORS

| After Sputtering | | After Brazing (After 3 Days) | | | | After 100 Cycles | | After 300 Cycles | |
|---|---|---|---|---|---|---|---|---|---|
| At 1 V | | At 1 V | | At 50 mV | | At 50 mV | | At 50 mV | |
| nF | D.F. % | nF | D.F. % | nF | D.F. % | nF | D.F. % | nF | D.F. % |
| 150.4 | 1.2 | 128.9 | 2.7 | 121.3 | 1.6 | 125.2 | 1.6 | 125.5 | 1.6 |
| 137.6 | 1.2 | 124.6 | 3.2 | 116.4 | 2.0 | 117.8 | 2.0 | 118.4 | 2.1 |
| 158.6 | 1.3 | 115.7 | 3.9 | 108.2 | 2.7 | 108.7 | 2.8 | 110.2 | 2.8 |
| 179.1 | 1.4 | 134.3 | 3.9 | 126.5 | 2.8 | 126.7 | 2.8 | 129.0 | 2.8 |
| 161.7 | 1.2 | 126.8 | 2.6 | 120.7 | 1.8 | 121.0 | 1.8 | 122.7 | 1.8 |
| 141.8 | 1.2 | 114.8 | 5.3 | 107.9 | 4.0 | 108.4 | 4.1 | 108.8 | 4.2 |
| 149.3 | 1.1 | 114.7 | 5.1 | 114.7 | 4.1 | 107.8 | 4.4 | 108.6 | 4.4 |

Capacitors from Lot No. N57878-GZBI were terminated by sputtering 2,500 A Ti and 7,500 A Ni. (The dissipation factor at 50 mV after sputtering is about 0.6%.)

TABLE (3a)

ELECTROLESS Ni—PLATED CAPACITORS

| | | After Sealing | | | | After 100 Cycles | | After 300 Cycles | |
|---|---|---|---|---|---|---|---|---|---|
| Run No. | Before Sealing | | After 1 day | | After 3 days | | After 3 days | | After 3 days | |
| | nF | D.F. % | nF | D.F. % | nF | D.F. % | nF | D.F. % | nF | D.F. % |
| 79 | 131.1 | 0.7 | 112.1 | 1.9 | 102.7 | 1.6 | 111.3 | 1.8 | 108.3 | 1.7 |
| 80 | 119.3 | 0.7 | 114.6 | 2.0 | 104.2 | 1.4 | 111.8 | 1.6 | 108.5 | 1.4 |
| 81 | 127.4 | 0.7 | — | — | 113.0 | 1.8 | 116.7 | 1.7 | 116.6 | 1.6 |
| 82 | 130.4 | 0.5 | — | — | 112.7 | 1.9 | 116.1 | 1.8 | 115.7 | 1.7 |
| 83* | 134.5 | 0.6 | 125.2 | 2.5 | 115.8 | 1.9 | 117.9 | 1.7 | 119.2 | 1.7 |
| 84 | 131.2 | 0.6 | 119.9 | 1.6 | 112.6 | 1.6 | 117.4 | 1.8 | 117.9 | 1.8 |
| 85 | 136.8 | 0.6 | 121.8 | 1.6 | 112.8 | 1.5 | 119.0 | 1.6 | 119.1 | 1.6 |
| 86** | 130.0 | 0.5 | 126.8 | 2.7 | 111.3 | 2.2 | 115.5 | 2.4 | 112.1 | 2.1 |
| Tot Avg | 130.1 | 0.6 | | | 110.6 | 1.7 | 115.7 | 1.7 | 114.7 | 1.7 |

*In both runs #83 and #86, 1 capacitor showed a high dissipation factor and was not counted in run average.
**Run #86 was held at temperature about 4 times as long as normal and was not included in total average.

TABLE (3b)

ELECTROLYTIC Ni—PLATED CAPACITORS

| Run No. | Before Sealing | | After Sealing | | | | After 100 Cycles | | After 300 Cycles | |
|---|---|---|---|---|---|---|---|---|---|---|
| | | | After 1 day | | After 3 days | | After 3 days | | After 3 days | |
| | nF | D.F. % | nF | D.F. % | nF | D.F. % | nF | D.F. % | nF | D.F. % |
| 71 | 124.1 | 0.5 | — | — | 113.0 | 1.1 | 120.0 | 1.4 | 113.2 | 1.2 |
| 72 | 132.8 | 0.8 | — | — | 117.7 | 1.1 | 123.4 | 1.3 | 121.1 | 1.2 |
| 73 | 126.7 | 0.7 | — | — | 114.8 | 1.4 | 117.8 | 1.4 | 116.7 | 1.3 |
| 74* | 131.4 | 0.6 | 114.1 | 1.8 | 105.8 | 1.6 | 108.7 | 1.7 | 106.8 | 1.6 |
| 75 | 125.8 | 0.7 | 119.2 | 1.2 | 108.9 | 1.1 | 114.8 | 1.2 | 115.9 | 1.2 |
| 76 | 126.9 | 0.7 | 120.0 | 1.4 | 108.8 | 1.3 | 112.5 | 1.3 | 113.5 | 1.4 |
| 77 | 127.8 | 0.7 | 131.0 | 1.5 | 118.4 | 1.3 | 121.2 | 1.3 | 121.4 | 1.4 |
| 78 | 129.6 | 0.6 | 124.5 | 1.7 | 111.0 | 1.5 | 115.2 | 1.6 | 115.8 | 1.5 |
| Tot Avg | 128.1 | 0.7 | | | 112.3 | 1.3 | 116.7 | 1.4 | 115.6 | 1.4 |

*Run #74 was held at temperature about 2 times as long as normal.
Table (3). Summary of results of brazing multilayer capacitors into MONO-GLASS configuration and subsequent temperature cycling. The results were obtained on 48 electroless and 48 electrolytic nickel plated capacitors (Lot No. BIZ 0570-48Z050 BI 114). Each run contains 6 capacitors. The reported results are the average of 6 measurement. The brazing and sealing temperature is 703° C. for about 3 min. The braze alloy used was WESGO Incusil (ag 61.5%, Cu 24%, In 14.5%) - 400 mesh. The glass sleeves and the Dumet slugs are of the same kind as used with conventional MONO-GLASS capacitors. The capacitors were temperature cycled between 210° C. and 30° C. (T = 180° C.) with 20 minutes to heat up and 20 minutes to cool down. The electrical measurements were performed on a LCR meter HP 4262A at 1 kHz and 50 mV applied voltage.

The capacitors made in accordance with the present disclosure yield an improved metallurgical contact in hermetically sealed, glass-encapsulated monolithic chip capacitors instead of a simple pressure contact that is prevalent in prior art, commercially available units and which is liable to become intermittent after some temperature cycling. These capacitors have a metallurgical bond between the capacitor termination and the end cap. Furthermore, two of the three embodiments presented can be made with the same temperature range and atmosphere as is currently used commercially and can use the present commercial glass sleeves. The third embodiment requires the use of a different soft glass with the same thermal expansion coefficient but with a higher softening temperature. However, this glass, known as bottle glass, is also readily available. The significant difference from the present commercially available hermetically sealed, glass-encapsulated capacitors is the application of ceramic-to-metal bonding techniques to improve the reliability under extreme temperature cycling conditions. The metallurgical bonding of the Dumet end cap to the ceramic capacitor is not described in the prior art.

We claim:

1. An improved hermetically sealed, glass-encapsulated capacitor assembly including a monolithic ceramic chip capacitor with conductive end terminations of silver, a pair of flexible metal leads each with an enlarged inflexible end cap having an end face in proximity with a respective conductive end termination of said capacitor, said proximate component ends and end caps being of dissimilar metals, a glass sleeve surrounding said component and end caps with direct physical glass-to-metal contact between said sleeve and the lateral surfaces of said end caps, said physically contacting glass and metal surfaces being positioned to be heat sealed, wherein the improvement comprises: a nickel coating over said silver end terminations; and a coating of silver over said nickel plating, said coatings selected to effect a brazing between said end terminations and said end caps when said assembly is heat sealed.

2. The capacitor of claim 1, wherein said nickel coating is electrolessly plated.

3. The capacitor of claim 1, wherein said nickel coating is electrolytically plated.

4. The capacitor of claim 1, wherein said nickel coating is sputtered.

5. The capacitor of claim 1, wherein said indium, copper and silver is sputtered on said nickel coating.

6. An improved hermetically sealed, glass-encapsulated capacitor assembly including a monolithic ceramic chip capacitor with conductive end terminations of sputtered titanium, a pair of flexible metal leads each with an enlarged inflexible end cap having an end face in proximity with a respective conductive end termination of said capacitor, said proximate component ends and end caps being of dissimilar metals, a glass sleeve surrounding said component and end caps with direct physical glass-to-metal contact between said sleeve and the lateral surfaces of said end caps, said physically contacting glass and metal surfaces being positioned to be heat sealed, wherein the improvement comprises:
 a sputtered nickel coating sputtered over said sputtered titanium end terminations;
 a brazing alloy coating of a eutectic copper silver alloy sputtered over said nickel coating;
 said glass sleeve is fabricated from a bottle glass; and
 said additional metal coatings being selected to effect a brazing between said terminations and said end caps when said assembly is heat sealed.

* * * * *

UNITED STATES PATENT AND TRADEMARK OFFICE
CERTIFICATE OF CORRECTION

PATENT NO. : 4,446,502

DATED : May 1, 1984

INVENTOR(S) : OTMAR H. BOSER ET AL

It is certified that error appears in the above-identified patent and that said Letters Patent is hereby corrected as shown below:

On the Title Page:

Please change the Assignee from "U.S. Philips Corporation" to --North American Philips Corporation--

Signed and Sealed this

Thirtieth Day of October 1984

[SEAL]

Attest:

GERALD J. MOSSINGHOFF

Attesting Officer

Commissioner of Patents and Trademarks